Jan. 20, 1959 T. C. G. WAGNER 2,870,411

FREQUENCY MODULATED OSCILLATOR

Filed April 21, 1953

INVENTOR
THOMAS C. G. WAGNER

BY Scrivener & Parker

ATTORNEYS

United States Patent Office 2,870,411

Patented Jan. 20, 1959

2,870,411

FREQUENCY MODULATED OSCILLATOR

Thomas C. G. Wagner, Brookdale, Md., assignor, by mesne assignments, to Minneapolis-Honeywell Regulator Company, a corporation of Delaware Application April 21, 1953, Serial No. 350,035

1 Claim. (Cl. 332—16)

This invention relates to frequency modulated oscillators of the free-running phantastron type and has as its object the modification of such an oscillator to permit alternating current modulation of the frequency of oscillation without depreciation of the average frequency stability.

In the drawings forming part of this application,

Figure 1:
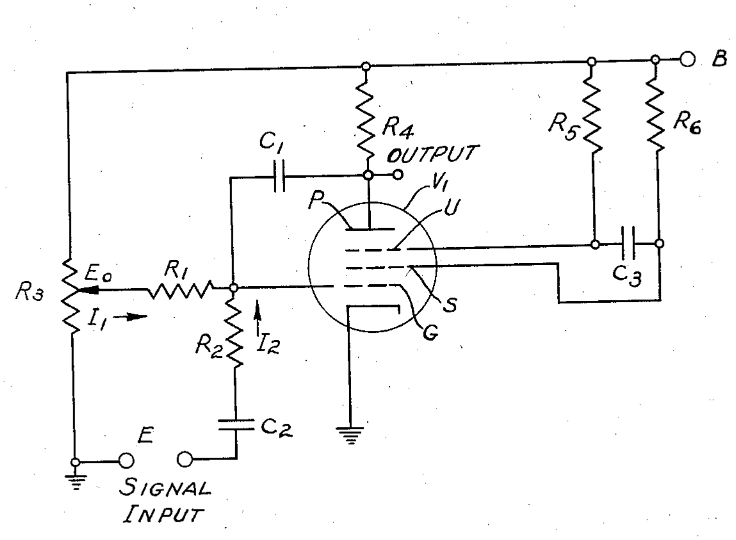
Fig. 1 is a circuit diagram of an oscillator according to the invention.

The oscillator circuit disclosed in the drawings comprises signal input E, resistors $R_3$ and $R_4$ which are connected in series between the grounded input terminal and the plate of a high gain pentode vacuum tube $V_1$, a resistor $R_1$ which is connected between the grid G of tube $V_1$ and a tap to resistor $R_3$, condenser $C_1$ which is connected between the grid G and plate P of tube $V_1$, resistor $R_5$ which is connected between the B-supply and the suppressor U of tube $V_1$, resistor $R_6$ which is connected between the B-supply and the screen S of tube $V_1$, and condenser $C_3$, which is connected between the screen and the suppressor of tube $V_1$. The cathode of tube $V_1$ is grounded in the usual manner of such circuits. The described circuit is conventional and is modified in accordance with the invention by the addition of capacitor $C_2$ and resistor $R_2$ which are connected in series between the un-grounded input terminal and the grid of tube $V_1$ for a purpose and with an effect which will be explained.

Figure 2:
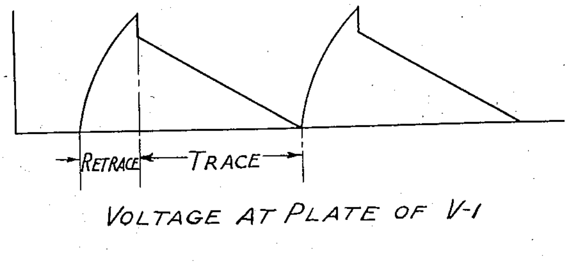
Figs. 2, 3 and 4 show the wave forms at three points in the circuit.

The circuit is a free-running phantastron type oscillator as described in "Waveforms," pp. 197–199 by Chance et al., published by McGraw-Hill Book Company, Inc. In this type of circuit there are two phases of operation. In the first, which I refer to as the trace, the suppressor is not negative, and the vacuum tube acts as a feedback integrator. The plate voltage waveform, shown in Fig. 2*a*, is a decreasing linear function of time, the slope of which is proportional to the sum of the currents $I_1$ and $I_2$ in Fig. 1.

A simple explanation of this behavior is that, during this period, the connection of capacitor $C_1$ between plate P and grid G of the high gain vacuum tube $V_1$ holds the grid voltage essentially constant, and consequently $I_1$ and $I_2$ are constant as the grid, being negative cannot draw current. Thus a constant current, $I_1+I_2$, charges capacitor $C_1$, and since the grid terminal of $C_1$ is at a constant potential the plate of $C_1$ decreases linearly. In the second or retrace phase of the cycle the plate reaches a sufficiently low potential that a virtual cathode is formed between the screen and suppressor. When this occurs the transconductance from screen to suppressor is negative. These two electrodes are coupled through capacitor $C_3$. When the gain from suppressor to screen equals unity, the suppressor is driven negative by the screen, thus cutting off the plate current. At the same time the grid is driven positive by the current flowing through resistor $R_4$ and capacitor $C_1$ causing a large cathode current to flow to the screen.

Figure 3:
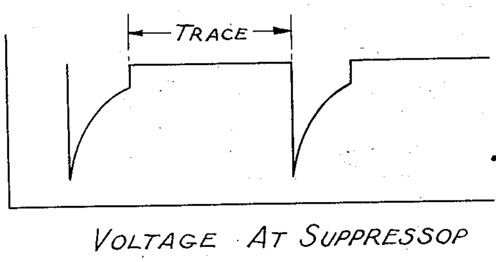
Figure 4:
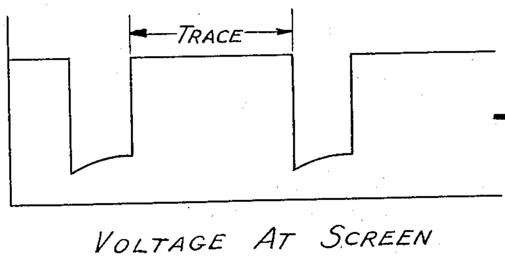

The current flowing from the cathode to the positive grid and through resistor $R_4$ recharges $C_1$ during the retrace period, the termination of which depends upon the factors that the plate voltage is increasing, the suppressor voltage shown in Fig. 3 is rising and the cathode current is decreasing. When the gain from suppressor to screen is again equal to unity, the screen current suddenly decreases and the rising screen potential drives the suppressor positive re-establishing the plate current and all the conditions at the start of the trace period, namely a negative grid, a positive suppressor and a high plate voltage.

The frequency of oscillation is inversely proportional to the sum of the trace and retrace times. Since the latter can be made a small portion of the former, the frequency of oscillation is to a good approximation inversely proportional to the trace time, but the inverse of the trace time is directly proportional to the sum of the currents $I_1$ and $I_2$. In the conventional circuit the only current is $I_1$ which is linearly dependent upon $E_0$. In order to achieve stability in the average frequency $E_0$ cannot be too low because the average potential at the grid of the vacuum tube depends upon many uncontrolled factors.

If the conventional phantastron circuit is employed, the signal voltage, $E_0$, must be large in order to achieve frequency stability. In the circuit according to this invention the resistor $R_2$ and the capacitor $C_2$ have been added. This permits the alternating current modulation of the frequency of the oscillation without depreciating the average frequency stability. This is true because since $I_2$ flows through capacitor $C_2$ the average value of $I_2$ must equal zero. In actual practise the connection of resistor $R_2$ and capacitor $C_2$ will have a minor effect upon the performance of the oscillator due to the fact that because of a non-zero retrace time the average grid voltage during the trace is not equal to the actual average grid voltage and the grid voltage is not absolutely constant during the trace.

In the circuit according to this invention the voltage $E_0$ is fixed and determines the average frequency. The instantaneous frequency is then linearly dependent upon the instantaneous value of the alternating current modulation $E_m$, and the sensitivity of the frequency to $E_m$ may be controlled by a suitable choice of $R_2$.

While I have described and illustrated one embodiment of my invention, it will be apparent to those skilled in the art to which the invention relates that other embodiments, as well as modifications of that disclosed, may be made and practised without departing from the spirit or scope of the invention, for the limits of which reference must be made to the appended claim.

What is claimed is:

In a frequency modulated signal generating oscillator, a pentode, a plate resistor connected between the plate of said pentode and a direct current supply source, a screen grid dropping resistor connected between the screen grid and said source, a control grid return resistor, a control grid biasing resistor having an adjustable slider, said control grid return resistor being connected between said slider and the control grid of said pentode, a suppressor grid biasing resistor, a coupling capacitor connected between the screen grid and suppressor grid of said pentode, a charging capacitor connected between the plate and control grid of said pentode, means including said grid biasing resistor, said grid return resistor and a source of direct current for charging said charging capacitor whereby to establish a center frequency of oscillation of said oscillator, a signal input resistor and a blocking capacitor serially connected with respect to each other between said control grid and a source of alternating input signals, the other terminal of said source of input signals being connected to a terminal of said control grid biasing resistor, alternating signals from said source being applied through said series connected capacitor and resistor to vary the charging current to said charging capacitor, thereby modulating the oscillation frequency of said oscillator in accordance therewith, and an output means connected to the plate of said pentode.

References Cited in the file of this patent

UNITED STATES PATENTS

| | | |
|---|---|---|
| 2,172,746 | Young | Sept. 12, 1939 |
| 2,270,405 | Black | Jan. 20, 1942 |
| 2,418,269 | Lawson | Apr. 1, 1947 |
| 2,456,089 | Shenk et al. | Dec. 14, 1948 |
| 2,581,199 | Moe | Jan. 1, 1952 |
| 2,662,197 | Comte | Dec. 8, 1952 |
| 2,627,025 | Trembly | Jan. 27, 1953 |